(12) United States Patent
Fialho et al.

(10) Patent No.: US 8,711,174 B2
(45) Date of Patent: Apr. 29, 2014

(54) METHOD, APPARATUS AND COMPUTER PROGRAM PRODUCT FOR VISUALIZING WHOLE STREETS BASED ON IMAGERY GENERATED FROM PANORAMIC STREET VIEWS

(75) Inventors: André Tadeu Santos Fialho, Berlin (DE); David Murphy, Helsinki (FI)

(73) Assignee: Here Global B.V., Veldhoven (NL)

( * ) Notice: Subject to any disclaimer, the term of this patent is extended or adjusted under 35 U.S.C. 154(b) by 381 days.

(21) Appl. No.: 13/152,768

(22) Filed: Jun. 3, 2011

(65) Prior Publication Data

US 2012/0306913 A1     Dec. 6, 2012

(51) Int. Cl.
*G09G 5/00*     (2006.01)
(52) U.S. Cl.
USPC ....................................................... 345/629
(58) Field of Classification Search
None
See application file for complete search history.

(56) References Cited

U.S. PATENT DOCUMENTS

| | | |
|---|---|---|
| 2010/0118116 A1 | 5/2010 | Tomasz et al. |
| 2010/0123737 A1 | 5/2010 | Williamson et al. |
| 2010/0250109 A1 | 9/2010 | Johnston et al. |
| 2010/0302280 A1 | 12/2010 | Szeliski et al. |
| 2010/0325589 A1 | 12/2010 | Ofek et al. |
| 2011/0018902 A1 | 1/2011 | Ofek |
| 2011/0279452 A1 | 11/2011 | Ibe et al. |
| 2012/0038675 A1* | 2/2012 | Johnson et al. ............... 345/660 |

FOREIGN PATENT DOCUMENTS

| | | |
|---|---|---|
| EP | 2 194 508 A1 | 6/2010 |
| JP | 2006-113857 A | 4/2006 |

OTHER PUBLICATIONS

International Search Report and Written Opinion from International Application No. PCT/IB2012/052785, mailed Dec. 3, 2012.
Kopf J et al.; "Street Slide: Browsing Street Level Imagery"; ACM Transactions on Graphics; Proceedings of SIGGRAPH 2010); Jul. 2010; vol. 29, No. 4; pp. 1-8.
Zheng, J. Y. et al., *Mapping Citiscapes Into Cyberspace for Visualization*, Comp. Anim. Virtual Worlds 16 (2005) 97-107.
Xiao, J. et al., *Image-Based Street-Side City Modeling* [online] [retrieved Jun. 29, 2002]. Retrieved from the Internet: <URL: http://web.mit.edu/jxiao/Public/publication/2009/TOG/paper_high-res.pdf>. 12 pages.

* cited by examiner

*Primary Examiner* — Carlos Perromat
(74) *Attorney, Agent, or Firm* — Alston & Bird LLP (57) ABSTRACT

A method is provided for visualizing both sides of a street based on imagery generated from panoramic street views. In particular, example methods may include directing presentation of a first panoramic view representing a first side of a street, and directing presentation of a second panoramic view representing a second side of the street. The first and second panoramic views may be presented in a street view in a perspective representation where a bottom of the first panoramic view and a bottom of the second panoramic view may be foreshortened relative to a top of each respective panoramic view, and where the bottom of each of the first panoramic view and the second panoramic view are located on either side of a representation of the street. The first panoramic view and the second panoramic view may each be formed of at least two image segments stitched together.

20 Claims, 9 Drawing Sheets

METHOD, APPARATUS AND COMPUTER PROGRAM PRODUCT FOR VISUALIZING WHOLE STREETS BASED ON IMAGERY GENERATED FROM PANORAMIC STREET VIEWS

TECHNICAL FIELD

Example embodiments of the present invention relate generally to presentation of images for visualizing and interacting with a street, city, and/or point of interest and, in particular to a technique for presenting images to provide a visualization of both sides of a street simultaneously while providing an intuitive method of interacting with the visualization.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are increasingly becoming small, portable computing devices that are capable of running a variety of applications and providing a user with a display on which they may watch video, view web pages, play interactive games, or read text. Devices are often small enough to fit into a pocket to achieve desired portability of these devices; however, as the capabilities of the devices increases, the displays of such devices are used to display large amounts of information and view objects which have traditionally been displayed on larger, less portable displays. Mobile devices are often used for navigation purposes to determine travel routes or the location of a particular address. Satellite imagery and street-level imagery may be integrated into mapping and navigation applications such that a user may see an image of their destination or point of interest as would be viewed from a street or pathway. It may be desirable to provide an enhanced visualization and interaction method using satellite and/or street-level images to enhance a user experience.

BRIEF SUMMARY

In general, exemplary embodiments of the present invention provide an improved method of visualizing and interacting with streets based on street-level imagery. In particular, the method of example embodiments provides for visualizing both sides of a street based on panoramic images of objects on the sides of the street. The method may include directing presentation of a first panoramic view representing a first side of a street, and directing presentation of a second panoramic view representing a second side of the street. The first and second panoramic views may be presented in a street view in a perspective representation where a bottom of the first panoramic view and a bottom of the second panoramic view may be foreshortened relative to a top of each respective panoramic view, and where the bottom of each of the first panoramic view and the second panoramic view are located on either side of a representation of the street. The first panoramic view and the second panoramic view may each be formed of at least two image segments stitched together. A representation of the street may be presented between the bottom of the first panoramic view and the bottom of the second panoramic view. A plan view of the first panoramic view may be presented in response to a request to zoom in on the street-view. A satellite view of the street may be presented in response to a request to zoom out from the street-view. Interest content may be presented in the first panoramic view or the second panoramic view. The street-view may be presented in response to a mobile terminal operating in a portrait mode and a plan view of a panoramic view may be presented in response to the mobile terminal operating in a landscape mode.

According to another embodiment of the present invention, an apparatus is provided. The apparatus may include at least one processor and at least one memory including computer program code, the at least one processor and the at least one memory including computer program code. The at least one memory and the computer program code may be configured to, with the at least one processor, cause the apparatus to at least direct presentation of a first panoramic view representing a first side of a street, and direct presentation of a second panoramic view representing a second side of the street. The first panoramic view and the second panoramic view may be presented in a street-view in a perspective representation where a bottom of the first panoramic view and a bottom of the second panoramic view are foreshortened relative to the top of each respective panoramic view, and the bottom of the first panoramic view and the bottom of the second panoramic view may be located on either side of a representation of the street. The first panoramic view and the second panoramic view may each be formed from at least two image segments stitched together. The apparatus may further be configured to direct presentation of the street between the bottom of the first panoramic view and the bottom of the second panoramic view. The apparatus may further be configured to direct presentation of a plan view of the first panoramic view in response to a request to zoom in on the street-view. The apparatus may still further be configured to direct presentation of a satellite view of the street in response to a request to zoom out from the street-view. The apparatus may also be configured to direct presentation of interest content in the first panoramic view or the second panoramic view. The street-view may be presented in response to a mobile terminal operating in a portrait mode and a plan view of a panoramic view may be presented in response to the mobile terminal operating in a landscape mode.

A further embodiment of the invention may include a computer program product including at least one computer-readable storage medium having computer-executable program code instructions stored therein, the computer-executable program code instructions may include program code instructions for directing presentation of a first panoramic view representing a first side of a street, and program code instructions for directing presentation of a second panoramic view representing a second side of the street. The first panoramic view and the second panoramic view may be presented in a street-view in a perspective representation where a bottom of the first panoramic view and a bottom of the second panoramic view are foreshortened relative to the top of each respective panoramic view. The bottom of the first panoramic view and the bottom of the second panoramic view may be located on either side of a representation of the street. The first panoramic view and the second panoramic view may each be formed from at least two image segments stitched together. The computer program product may further include program code instructions for directing presentation of a representation of the street disposed between the bottom of the first panoramic view and the bottom of the second panoramic view. The computer program product may further include program code instructions for directing presentation of a plan view of the first panoramic view in response to a request to zoom-in on the street-view. The computer program product may also include program code instructions for directing presentation of interest content in the first panoramic view or the second panoramic view. The street-view may be presented in response to a mobile terminal operating in portrait mode and a plan view of a panoramic view may be presented in response to the mobile terminal operating in a landscape mode.

Another example embodiment of the present invention may provide an apparatus comprising means for directing presentation of a first panoramic view representing a first side of a street, and means for directing presentation of a second panoramic view representing a second side of the street. The first panoramic view and the second panoramic view may be presented in a street-view in a perspective representation where a bottom of the first panoramic view and a bottom of the second panoramic view are foreshortened relative to the top of each respective panoramic view, and the bottom of the first panoramic view and the bottom of the second panoramic view may be located on either side of a representation of the street. The first panoramic view and the second panoramic view may each be formed from at least two image segments stitched together. The apparatus may further include means for directing presentation of the street between the bottom of the first panoramic view and the bottom of the second panoramic view. The apparatus may further include means for directing presentation of a plan view of the first panoramic view in response to a request to zoom in on the street-view. The apparatus may still further include means for directing presentation of a satellite view of the street in response to a request to zoom out from the street-view. The apparatus may also be configured with means for directing presentation of interest content in the first panoramic view or the second panoramic view. The street-view may be presented in response to a mobile terminal operating in a portrait mode and a plan view of a panoramic view may be presented in response to the mobile terminal operating in a landscape mode.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
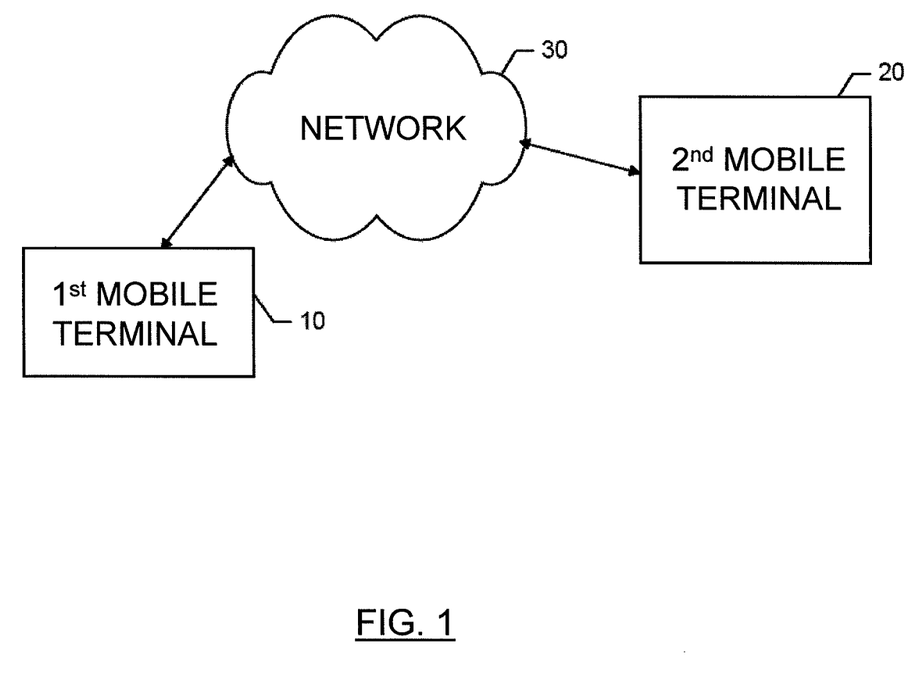
FIG. 1 illustrates an communication system in accordance with an example embodiment of the present invention.

Example embodiments of the present invention may include a mobile terminal which is operable on a network for receiving location data and retrieving information related to a navigation application or program on the mobile terminal through a session. A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth®. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals such as the mobile terminal 10 and the second mobile terminal 20 may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computer, laptop computer, mobile computers, cameras, video recorders, audio/video players, positioning devices, game devices, television devices, radio devices, or various other devices or combinations thereof.

Figure 2:
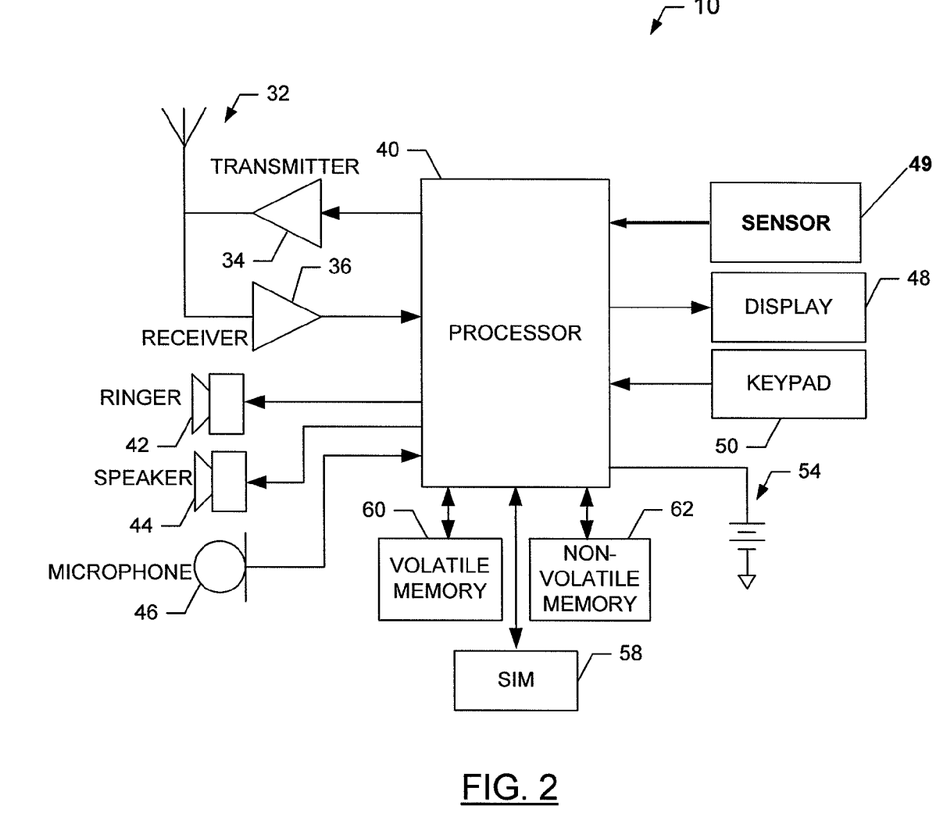
FIG. 2 is a schematic block diagram of a mobile device according to an example embodiment of the present invention.

Although the mobile terminal 10 may be configured in various manners, one example of a mobile terminal that could benefit from embodiments of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the present invention. As described, the mobile terminal may include various means for performing one or more functions in accordance with embodiments of the present invention, including those more particularly shown and described herein. It should be understood, however, that a mobile terminal may include alternative means for performing one or more like functions, without departing from the spirit and scope of the present invention.

The mobile terminal (e.g., mobile terminal 10) may, in some embodiments, be a computing device configured to employ an example embodiment of the present invention. However, in some embodiments, the mobile terminal may be embodied as a chip or chipset. In other words, the mobile terminal may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile terminal may therefore, in some cases, be configured to implement an embodiment of the present invention on a single chip or as a single "system on a chip." As such, in some cases, a chip or chipset may constitute means for performing one or more operations for providing the functionalities described herein.

The mobile terminal 10 illustrated in FIG. 2 may include an antenna 32 (or multiple antennas) in operable communication with a transmitter 34 and a receiver 36. The mobile terminal may further include a processor 40 that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved-UMTS terrestrial radio access network), with fourth-generation (4G) wireless communication protocols or the like.

It is understood that the apparatus may include circuitry implementing, among others, audio and logic functions of the mobile terminal 10. The processor may be embodied in a number of different ways. For example, the processor may be embodied as various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like), a hardware accelerator, and/or the like.

In an example embodiment, the processor 40 may be configured to execute instructions stored in the memory device 60 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to an embodiment of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal or network device) adapted for employing an embodiment of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile terminal 10 may also comprise a user interface including an output device such as an earphone or speaker 44, a ringer 42, a microphone 46, a display 48, and a user input interface, which may be coupled to the processor 40. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output. The mobile terminal 10 may also include a sensor 49, such as an accelerometer, motion sensor/detector, temperature sensor, or other environmental sensor to provide input to the processor indicative of a condition or stimulus of the mobile terminal 10.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, i.e., cell id identity or cell id information, with which the mobile terminal is in communication.

In general, example embodiments of the present invention provide a method for presenting images to provide a visualization of both sides of a street simultaneously while providing an intuitive method of interacting with the visualization. For example, a map or navigation application may present a map view to a user. The user may interact with the map, such as zooming-in on the map to view a more detailed representation of a particular area of interest. A user may require more detail than traditional maps provide such that upon zooming in to a certain proximity, the displayed portion of the map may present to the user a pictorial depiction of the street including panoramic pictures of both sides of a street, otherwise referred to herein as a "street-view." The street-view may include two panoramic pictures, one for each side of the street. The panoramic pictures may be presented in a perspective view with the bottom of each panoramic picture foreshortened to provide an image that resembles how the objects in the panoramic view may appear if viewed from a location above the street. The bottom of each panoramic picture may be situated adjacent to an image of the street or a representation of the street such that the street-view, which includes the two panoramic pictures in perspective, resembles how the street would look if viewed from a viewpoint above the street level. The degree of the perspective may be varied based upon the zoomed level of the view.

While the term "street" is used herein to describe a physical location that is depicted in the images and visualization, it is to be understood that the "street" may be any road, pathway, or other navigable thoroughfare (e.g., canals, rivers, hiking trails, bike paths, alleys, highways, or the like) which may benefit from example embodiments of the present invention.

Existing navigation and mapping programs may provide a user with a map view, a satellite view, and a street-level view. The map view may resemble a traditional cartographer map with lines and symbols representing roads and objects on the map. The satellite view may present a user with a photographic representation of the location as photographed by a satellite. Both the satellite view and the map view may be able to be zoomed in and out to provide the desired level of detail to a user and the map and satellite views may be combinable to provide a different level of detail to a user. As the satellite view is taken from a satellite hundreds of miles from the ground level, the images provided are of limited detail and the perspective of these images is generally from substantially directly overhead such that limited to no detail is available about objects along the sides of the streets as they would appear to a person on the street. The street-level view may provide a user with a view as if the user was standing in the street and viewing up or down the street, or to either the left or right side of the street. Street-level views are typically available only in increments or steps of anywhere from tens of feet to hundreds of feet. When a user is viewing a street-level view, the user is only able to view a limited level of detail and only within the viewpoint in which they are virtually positioned. Available imagery is typically panoramic in data, and a naïve visualization involves rendering the panoramas at a chosen location. Moving location, or browsing around then requires downloading and re-rendering the new panorama at each location, which may be slow due to the size of each downloaded panoramic image.

Figure 3:
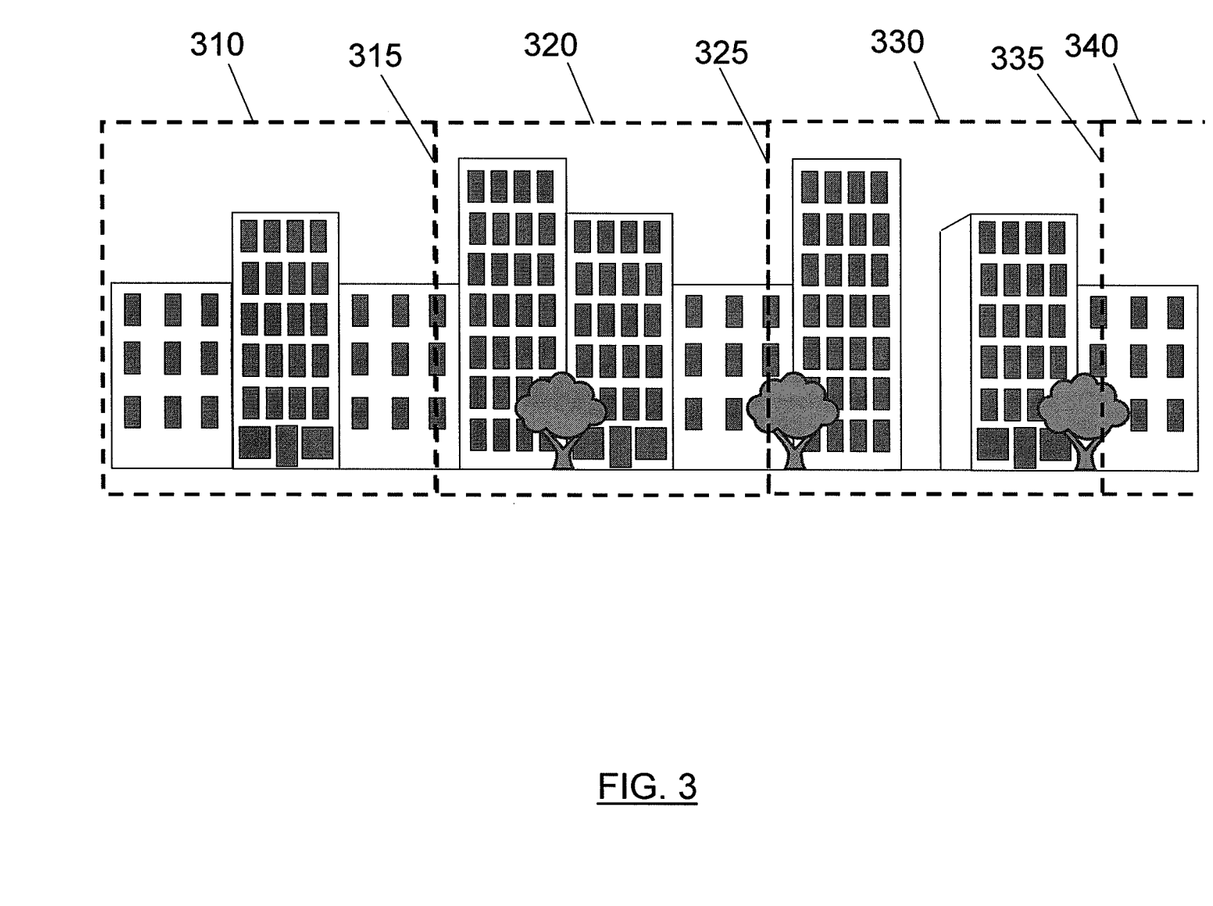
FIG. 3 illustrates a panoramic view of a side of a street comprising multiple images stitched together according to example embodiments of the present invention.
Figure 4:
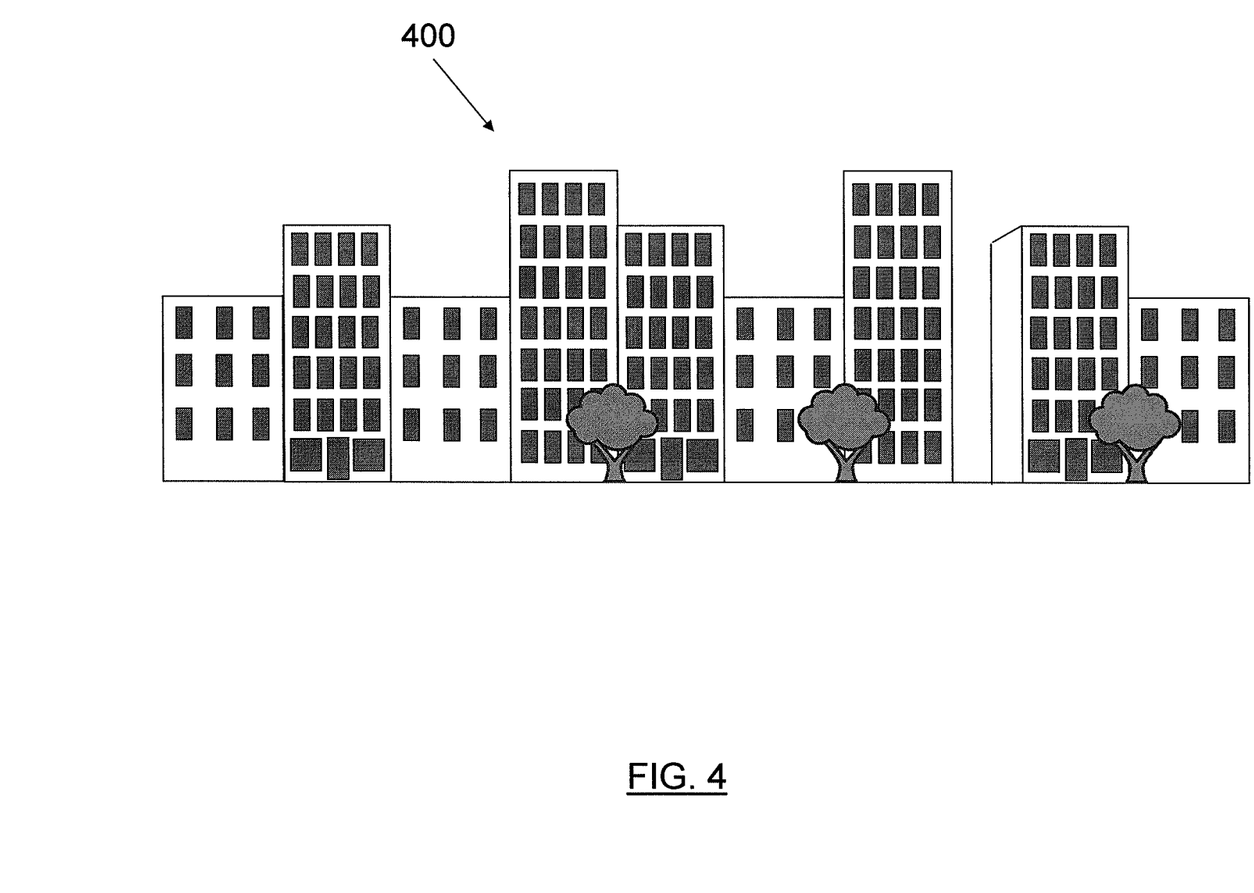
FIG. 4 illustrates a panoramic view of a side of a street as seen after a series of images have been stitched together according to an example embodiment of the present invention.

Embodiments of the present invention provide a method by which a user may view images depicting the street-level view of both sides of a street simultaneously while interacting with a navigation or mapping program. Embodiments of the present invention may render a set of still images from the panorama of the view from a street and stitch, or merge the images together to form a substantially continuous panoramic view of a side of the street. FIG. 3 illustrates a series of images 310, 320, 330, 340, stitched together along their edges 315, 325, 335, to create a panoramic image of one side of a street. The images may be stitched together by any known method including software or manual methods. The images, when stitched together, may form a substantially continuous panorama of the side of the street as shown in FIG. 4. Additionally, the panorama of the side of the street may contain three-dimensional (3D) images of the objects on that side of the street. For example, the environment may be modeled as textured 3D mesh models rather than pseudo-3D panoramas.

While a panoramic image 400 as shown in FIG. 4 is both useful and beneficial to a user navigating a street or looking for an address or point of interest, if the user does not know which side of the street to be observing, or if the user requires a more realistic street-view, the panoramic view 400 of FIG. 4 may not be sufficient. Embodiments of the present invention may use the panoramic views of both sides of the street to create an easily interpreted street-view depicting both sides of the street. In order to provide a user an easily interpreted street-view depicting both sides of the street, the panoramic views of each side of the street may be modified to an exaggerated projection, possibly with a street in between, such that the street-view appears as one would envision the street as viewed from a vantage point over the street, at or above the tops of the buildings or objects in the panoramic views adjacent the street.

Figure 5:
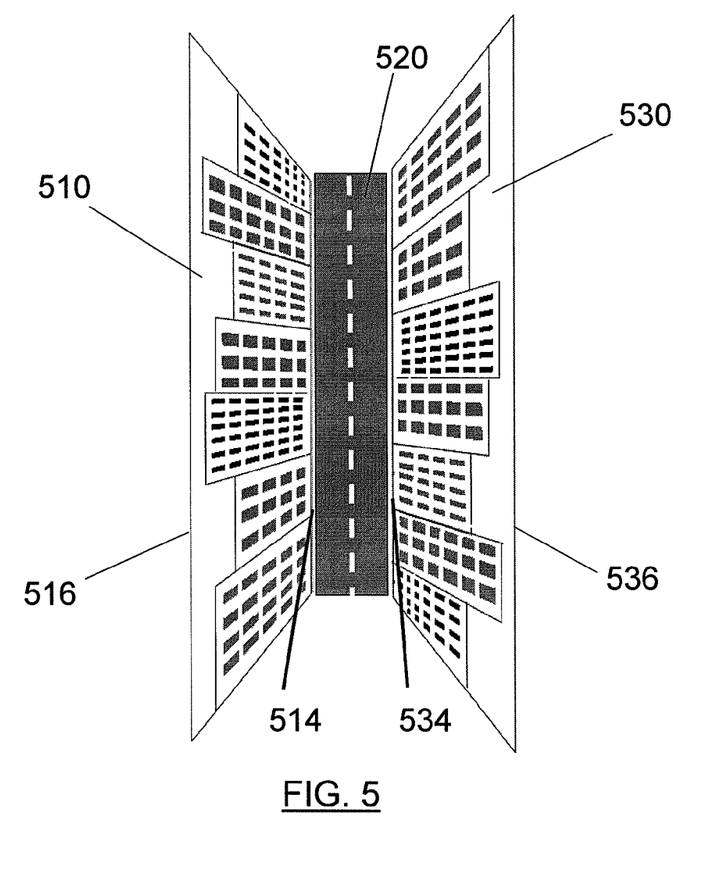
FIG. 5 illustrates a first panoramic view and a second panoramic view presented in a perspective presentation according to an example embodiment of the present invention.

FIG. 5 illustrates an example embodiment of the present invention in which a first panoramic view 510 of a first side of the street is depicted on a first side of the street, or a representation of the street 520. A second panoramic view 530 of a second side of the street may be depicted on a second side of the street 520. As images of the street may not be available, and further, may not be of significant use to a user, the image depicted between the first panoramic view 510 and the second panoramic view 530 may be a representation of the street. Further, the representation of the street 520 may be narrowed or widened to accommodate different sizes of panoramic views as the image of the street 520 may be provided only for reference and ease of interpretation by a user. The panoramic views 510 and 530 may be presented in an exaggerated projection, or perspective view whereby the bottom edges 514, 534 of the panoramic view closest to the street 520 are foreshortened to appear as if it is further away than the top edges 516, 536 of the panoramic view 510, 530. Such a perspective of the panoramic images provides the user with an image that appears as one would imagine the street to appear as viewed from a viewpoint just above the elevation of the objects in the panoramic images. The perspective of the panoramic images may be modeled as a textured 3D mesh model in which the buildings or objects in the panoramic images appear to extend out of the screen toward a user creating an immersive photorealistic 3D environment.

Figure 6:
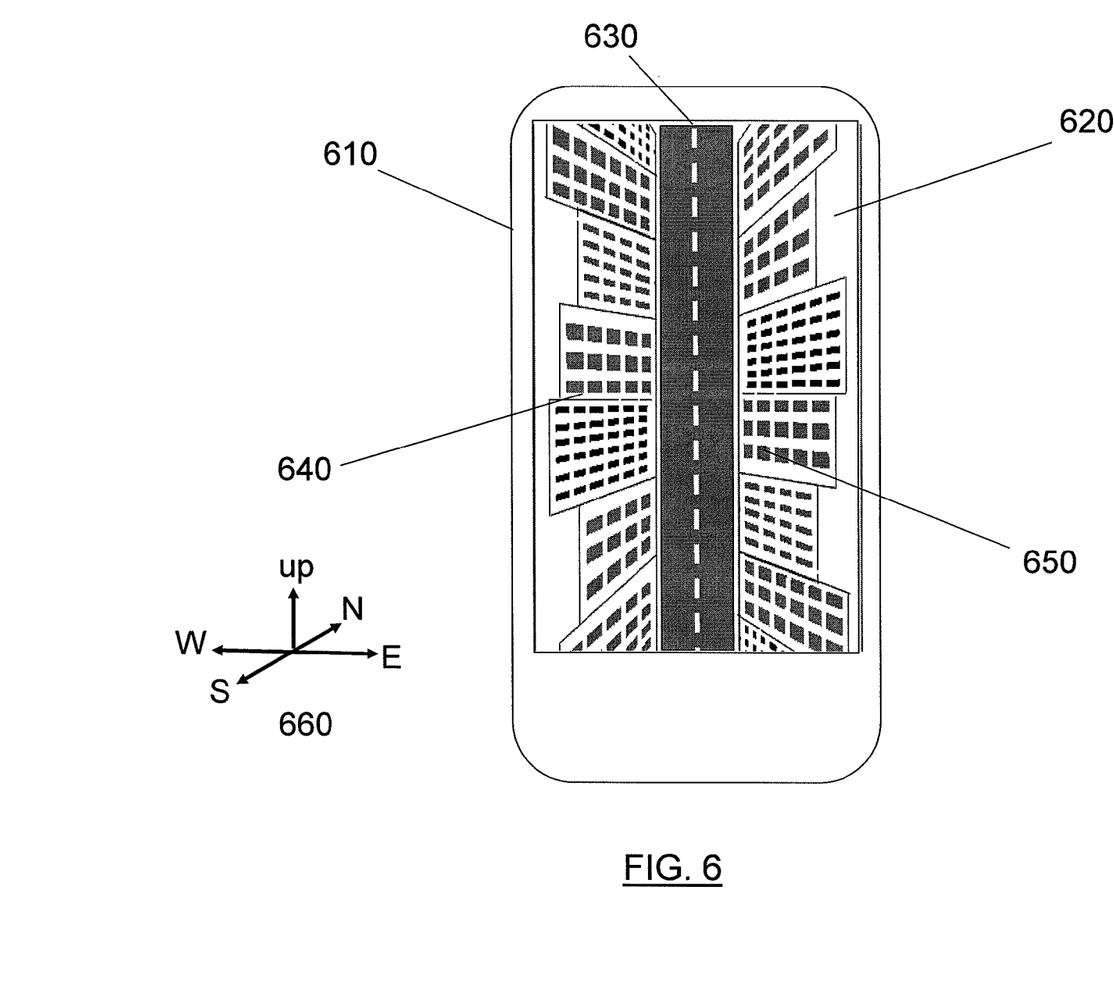
FIG. 6 depicts a mobile terminal displaying first and second panoramic views in a street-view with the panoramic views disposed in a perspective representation according to an example embodiment of the present invention.
Figure 7:
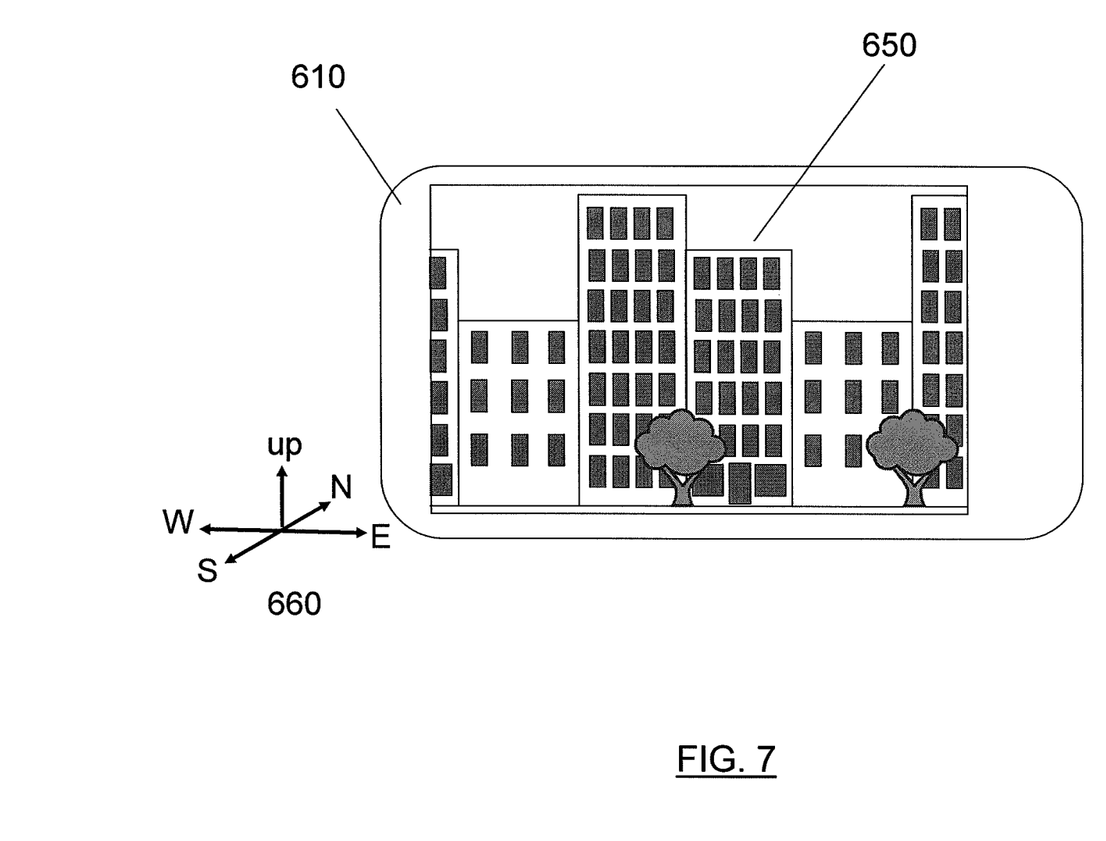
FIG. 7 depicts a mobile terminal displaying a panoramic view according to an example embodiment of the present invention.

FIG. 6 illustrates a mobile terminal 610 providing for presentation of a street-view 620 according to example embodiments of the present invention. Example embodiments may vary the depicted image based upon an orientation of the mobile terminal on which the street-view is presented. For example, in the illustrated embodiment of FIG. 6, a mobile terminal is oriented in the portrait orientation, with a narrow dimension of the rectangular display 630 pointing up, as illustrated by 660. A user may wish to see more detail of one or more of the objects from one of the panoramic images depicted in the street-view. To view either of the panoramic images in more detail, a user may simply rotate the mobile terminal 610 to cause the mobile terminal to present the desired panoramic image in more detail. For example, the user may rotate the mobile terminal 610 ninety degrees in a clockwise direction to see a plan view of the panoramic image 640 on the left side of the street in more detail, or ninety degrees in a counter-clockwise direction to see a plan view of the panoramic image 650 on the right side of the street. FIG. 7 illustrates one of the panoramic images 650 of FIG. 6 depicted in more detail in a plan view in response to the mobile terminal 610 being rotated counter-clockwise by ninety degrees. This presentation of the panoramic image 650 may allow a user to more clearly see details of the objects visible in the panoramic image 650.

Example embodiments of the present invention may include a zoom feature configured to show greater detail of a smaller area in a zoomed-in mode or less detail of a greater area in a zoomed-out mode. As such, when zoomed-in from the view depicted in FIG. 6, a detail view of one of the panoramic views may be presented on the mobile terminal, as shown in FIG. 7. Zooming out from the panoramic view of FIG. 7 may result in a street-view being presented as shown in FIG. 6. Zooming out further from the street-view of FIG. 6 may result in a satellite view which displays a series of stitched-together pictures as captured by satellites. Thus, the street-view may be a detail level that is between the highly detailed panoramic view of FIG. 7 and the low detail view provided by the satellite view. The transitions between the street-view and panoramic view or street-view and satellite views may be performed by an animation of "flying" into or out-of the location from which the zoom operation is performed. Similarly, while in the street-view or panoramic view, the user may transition to an immersive 3D environment of either type of view. For example, in the panoramic view of stitched-images a user may choose to transition to a detailed 3D environment where photorealistic 3D images of the objects in the panorama are depicted. Optionally, the 3D view may be comprised of abstract 3D environments of extruded footprints to provide a virtual 3D depiction of the panoramic view or street-view. The 3D environment may comprise images also used in the stitched together panoramic view; however, the 3D environment adds further detail and additional images to create a virtual 3D representation of the environment.

Figure 8:
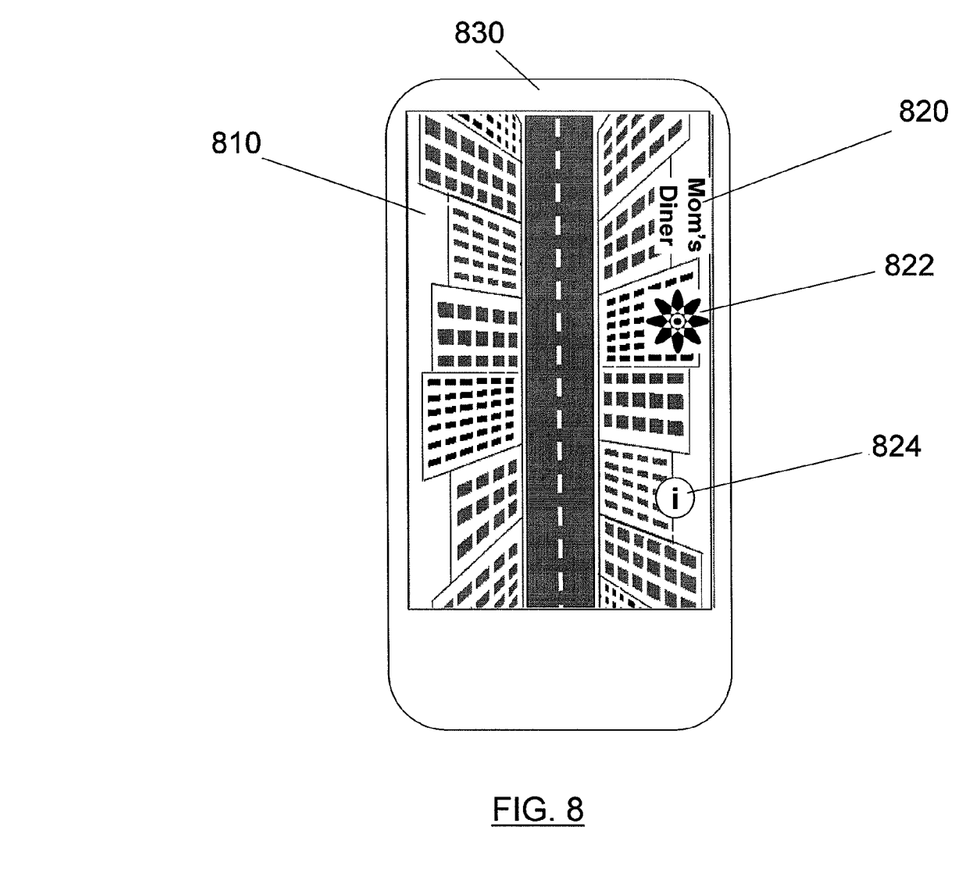
FIG. 8 illustrates a mobile terminal displaying a street-view with interest content according to an example embodiment of the present invention.

FIG. 8 illustrates an example embodiment of additional features that may be provided by embodiments of the present invention including depicting details of the panoramic images displayed in a street-view. For example, interest content 820, 822, 824 may be presented on a display 810 with the panoramic images. The interest content may include such things as the name of a location 820 (e.g., a store, restaurant, point-of-interest, etc.). Optionally, a logo 822 may be presented that is representative of the location proximate which the logo 822 is displayed. For example, a flower may be presented proximate the location of a florist, or possibly the logo of a fast-food chain may be presented proximate franchise location. Further, interest content may be presented that is indicative that more information is available about a particular location, such as the icon 824 presented on the display 810. Selecting the icon 824 may cause an information window to be presented which may provide additional details about the location over which the icon 824 was displayed. Such information may include the hours of operation of an establishment or link to the website of the establishment. Further, selection of the icon 824 may offer the user the option of calling, emailing, or otherwise contacting the establishment to which the icon 824 is associated.

Figure 9:
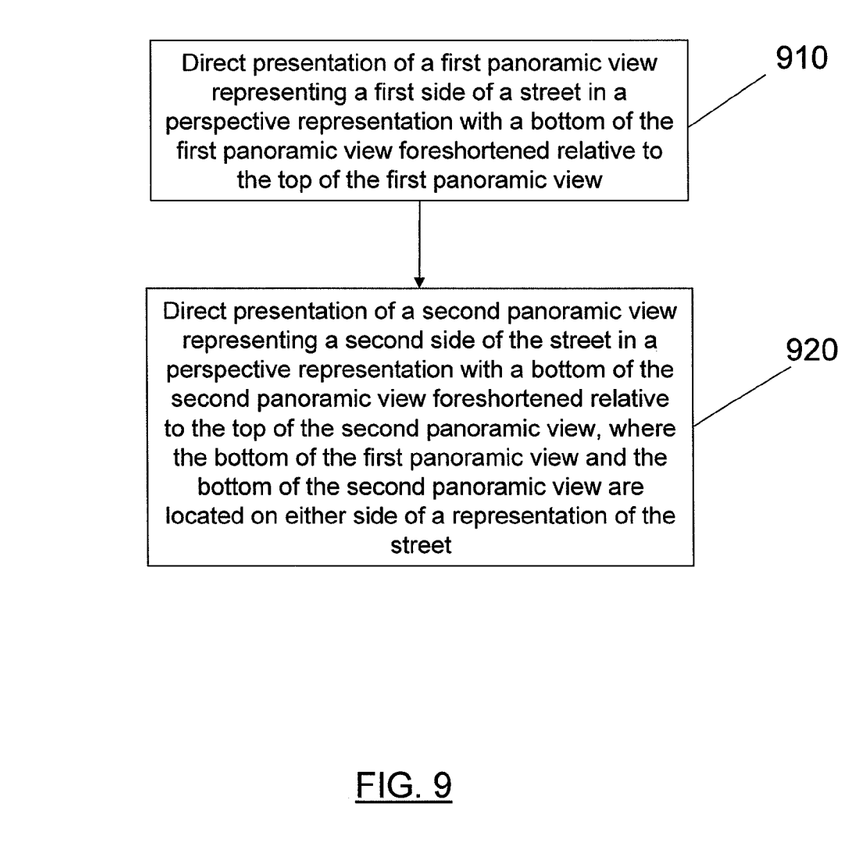
FIG. 9 illustrates a flow chart of a method for visualizing both sides of a street based on imagery generated from panoramic views according to an example embodiment of the present invention.

FIG. 9 is a flowchart illustrative of a system, method and program product according to example embodiments of the invention. The flowchart operations may be performed by a mobile terminal, such as shown in FIG. 2, as operating over a communications network such as that shown in FIG. 1. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

An example embodiment of a method of the present invention in which a street may be visualized based on imagery generated from panoramic street-views is depicted in the flowchart of FIG. 9. Presentation of a first panoramic view representing a first side of a street in a perspective representation with a bottom of the first panoramic view foreshortened relative to the top of the first panoramic view may be directed at 910. A second panoramic view representing a second side of the street in a perspective representation with a bottom of the second panoramic view foreshortened relative to the top of the second panoramic view may be directed at 920, where the bottom of the first panoramic view and the bottom of the second panoramic view are located on either side of a representation of the street.

In an example embodiment, an apparatus for performing the method of FIG. 9 above may comprise a processor (e.g., the processor 40) configured to perform some or each of the operations (910-920) described above. The processor may, for example, be configured to perform the operations (910-920) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 910-920 may comprise, for example, the processor 40 and/or a device or circuit for executing instructions or executing an algorithm for processing information as described above.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    directing presentation of a first panoramic view representing a first side of a street; and
    directing presentation of a second panoramic view representing a second side of the street;
    wherein the first panoramic view and the second panoramic view are presented in a street-view in a perspective representation wherein a bottom of the first panoramic view and a bottom of the second panoramic view are foreshortened relative to a top of each respective panoramic view, wherein the bottom of the first panoramic view and the bottom of the second panoramic view are located on either side of a representation of the street, and
    wherein the street-view is presented in response to a mobile terminal operating in a portrait mode and a plan view of a panoramic view is presented in response to the mobile terminal operating in a landscape mode.

2. The method according to claim 1, wherein the first panoramic view and the second panoramic view are each formed from at least two image segments stitched together.

3. The method according to claim 1, further comprising a representation of the street disposed between the bottom of the first panoramic view and the bottom of the second panoramic view.

4. The method according to claim 1, further comprising directing presentation of a plan view of the first panoramic view in response to a request to zoom in on the street-view.

5. The method according to claim 1, further comprising directing presentation of a satellite view of the street in response to a request to zoom out from the street-view.

6. The method according to claim 1, further comprising directing presentation of interest content in first panoramic view or in the second panoramic view.

7. The method of claim 1, further comprising:
    directing presentation of a plan view of a panoramic view of the first side of the street in response to the mobile terminal being rotated to a landscape orientation in a first direction; and
    directing presentation of a plan view of a panoramic view of the second side of the street in response to the mobile terminal being rotated to a landscape orientation in a second direction, opposite the first direction.

8. An apparatus comprising at least one processor and at least one memory including computer program code, the at least one memory and the computer program code configured to, with the at least one processor, cause the apparatus to at least perform:
    direct presentation of a first panoramic view representing a first side of a street; and
    direct presentation of a second panoramic view representing a second side of the street;
    wherein the first panoramic view and the second panoramic view are presented in a street-view in a perspective representation wherein a bottom of the first panoramic view and a bottom of the second panoramic view are foreshortened relative to the top of each respective panoramic view, wherein the bottom of the first panoramic view and the bottom of the second panoramic view are located on either side of a representation of the street, and wherein the street-view is presented in response to a mobile terminal operating in a portrait mode and a panorama view is presented in response to the mobile terminal operating in a landscape mode.

9. The apparatus according to claim 8, wherein the first panoramic and the second panoramic view are each formed from at least two image segments stitched together.

10. The apparatus according to claim 8 wherein the apparatus is further configured to direct presentation of the street between the bottom of the first panoramic view and the bottom of the second panoramic view.

11. The apparatus according to claim 8, wherein the apparatus is further configured to direct presentation of a plan view of the first panoramic view in response to a request to zoom in on the street-view.

12. The apparatus according to claim 8, wherein the apparatus is further configured to direct presentation of a satellite view of the street in response to a request to zoom out from the street-view.

13. The apparatus according to claim 8, wherein the apparatus is further configured to direct presentation of interest content in the first panoramic view or in the second panoramic view.

14. The apparatus of claim 8, wherein the apparatus is further caused to:
   direct presentation of a plan view of a panoramic view of the first side of the street in response to the mobile terminal being rotated to a landscape orientation in a first direction; and
   direct presentation of a plan view of a panoramic view of the second side of the street in response to the mobile terminal being rotated to a landscape orientation in a second direction, opposite the first direction.

15. A computer program product comprising at least one non-transitory computer-readable storage medium having computer-executable program code instructions stored therein, the computer-executable program code instructions comprising:
   program code instructions for directing presentation of a first panoramic view representing a first side of a street; and
   program code instructions for directing presentation of a second panoramic view representing a second side of the street;

wherein the first panoramic view and the second panoramic view are presented in a street-view in a perspective representation wherein a bottom of the first panoramic view and a bottom of the second panoramic view are foreshortened relative to the top of each respective panoramic view, wherein the bottom of the first panoramic view and the bottom of the second panoramic view are located on either side of a representation of the street, and wherein the street-view is presented in response to a mobile terminal operating in a portrait mode and a plan view of a panoramic view is presented in response to the mobile terminal operating in a landscape mode.

16. The computer program product of claim 15, wherein the first panoramic and the second panoramic view are each formed from at least two image segments stitched together.

17. The computer program product of claim 15, further comprising program code instructions for directing presentation of a representation of the street disposed between the bottom of the first panoramic view and the bottom of the second panoramic view.

18. The computer program product of claim 15, further comprising program code instructions for directing presentation of a plan view of the first panoramic view in response to a request to zoom-in on the street-view.

19. The computer program product of claim 15, further comprising program code instructions for directing presentation of interest content in the first panoramic view or in the second panoramic view.

20. The computer program product of claim 15, further comprising:
   program code instructions for directing presentation of a plan view of a panoramic view of the first side of the street in response to the mobile terminal being rotated to a landscape orientation in a first direction; and
   program code instructions for directing presentation of a plan view of a panoramic view of the second side of the street in response to the mobile terminal being rotated to a landscape orientation in a second direction, opposite the first direction.

* * * * *